No. 12,642. REISSUED APR. 23, 1907.

J. SCHADE, JR.

SPRING TERMINAL CLIP.

APPLICATION FILED MAR. 11, 1907.

Attest:

A. L. O'Brien

Inventor:

John Schade, Jr., by Dickerson, Brown, Raegener & Binney Attys.

UNITED STATES PATENT OFFICE.

JOHN SCHADE, JR., OF BROOKLYN, NEW YORK, ASSIGNOR TO FAHNESTOCK ELECTRIC COMPANY, A CORPORATION OF WEST VIRGINIA.

SPRING TERMINAL-CLIP.

No. 12,642. Specification of Reissued Letters Patent. Reissued April 23, 1907.

Original No. 845,268, dated February 26, 1907. Application for reissue filed March 11, 1907. Serial No. 361,890.

*To all whom it may concern:*

Be it known that I, JOHN SCHADE, Jr., a citizen of the United States, residing at borough of Brooklyn, county of Kings, State of New York, have invented certain new and useful Improvements in Spring Terminal-Clips, of which the following is a specification.

This invention relates to spring terminal-clips or fastening devices for the terminals of electrical conductors; and the objects of the invention are to enable the conductor to be firmly gripped and clamped in defined position, permit the ready insertion and removal of the conductor, and insure good electrical contact at all times between the conductor and the fastening device.

This application is for the same invention as that covered by my application, Serial No. 179,101, filed October 29, 1903, with additional features.

Further objects of the invention will hereinafter appear; and to these ends the invention consists of a fastening device for carrying out the above objects embodying the features of construction, combinations of elements, and arrangement of parts having the general mode of operation substantially as hereinafter fully described and claimed in this specification and shown in the accompanying drawings, in which—

Figure 1:
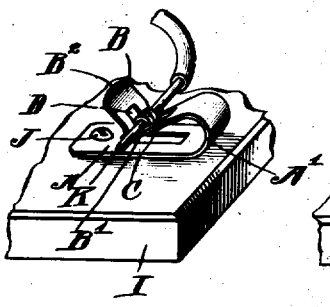

Figure 1 is a perspective view of a fastening device embodying the invention. Figs. 2 to 7, inclusive, are perspective views of modifications of the invention. Fig. 8 is a perspective view of a modification.

My improved fastening device is preferably made from a single piece of resilient material—as, for instance, sheet metal or flat metallic ribbon having substantially greater width than thickness—although I am not to be understood as limiting the invention to this particular form of material, for other forms of resilient metal may be found suitable for carrying out the invention.

The fastening device comprises, broadly, two opposing normally separated members, at least one of which is provided with a retaining portion of suitable shape projecting toward the opposite member and adapted to coact with said opposite member to firmly clamp a conductor in defined position when said members are forced into operative relationship.

In order to construct two opposing but normally separated members, the piece of resilient material is bent upon itself to bring one member opposite the other, and one of these members, which may be termed the "body" member A, is adapted to be secured to a base or support I in any suitable manner, as by means of the screw J, passing through a hole in the body portion A. The body member A is thus fixed stationary upon the base or support I, while the opposing member B, which may be termed a "spring" member, is adapted to be forced out of its normal position toward the body member A, from which it tends to separate under the retractive force of the spring, thus enabling a conductor K to be firmly gripped and clamped in defined position between the spring member B and the retaining portion C of the body member A.

The retaining portion C of the body A forms a stationary resistant member and is so constructed and shaped that a conductor is held therein and firmly gripped in defined position in such manner that it cannot be easily withdrawn in a transverse direction while under the influence of the pressure of the spring. Furthermore, the retaining portion C is so shaped as to provide a good electrical contact for the conductor. I have found that a substantially V-shaped retaining portion C, forming the resistant member fulfils the objects sought when combined with the other coöperating elements of my improved fastening device. I mean by a "V-shaped" portion a part having diverging sides and having the general conformation of a V, so that a conductor of suitable size when inserted in the angle of the V will make contact at at least two tangential points in the V.

In using my improved fastening device the size of the wire or conductor is preferably selected with reference to the angle of the V-shaped portion C, and a large wire would be placed in a V-shaped retaining portion having a wider angle of divergence, while a small wire would be placed in a V-shaped portion having a smaller angle of divergence, thus securing the best results in each case.

In order to more firmly grip and clamp the conductor, the spring member B may also be provided with an angular retaining portion, as shown in the drawings, adapted to coöperate with the angular portion of the resistant member C, so that when the spring member B is forced toward the body A a conductor K may be inserted in the angles of the spring and resistant members above the spring member, but beneath the inner surface of the angle of the resistant member. The retractive force of the spring when the member B is released grips the conductor in the angular portions of the spring and resistant members. Preferably the retaining-angles of the spring member B and the resistant member C are acute angles, as illustrated in Fig. 1, to enable the wire to be more firmly gripped and to afford provision for better electrical contact with the wire.

In order to obtain a strong spring-pressure in the fastening device, the resilient material from which the fastening device is made is bent upon itself in such manner as to bring the retaining-angle B′ of the spring member close to the loop A′, and the resistant member C is preferably situated intermediate the length of the body member A and near the loop A′ to properly coöperate with the angular portion of the spring member B. The single piece of resilient metal therefore comprises a body member A, a stationary resistant member C, projecting upward from the body member and having a hooked portion at its upper end, while a spring member projects upwardly from the body member at the forward end of the member, then downwardly toward the body member, then upwardly away from the body member.

In order to enable the strong spring formed by the construction described to be operated easily, the spring member is preferably provided with a thumb or finger piece $B^2$, extending beyond the angular portion B′. Less pressure is therefore required to flex the strong spring than if the point of pressure were applied substantially close to the retaining-angle B′ of the spring member. As shown in Fig. 1, the resistant member C in this instance consists of a tongue cut or stamped from the metal of the body member A, while the metal of the fastening device is slotted throughout at least a portion of its length, as at D. The resistant member C, as shown, projects outwardly from the body member A toward the opposing or spring member B and is normally in inoperative relation with the angular retaining portion of the spring member, although this is not essential, it only being requisite that the spring and body members be opposing, but normally separated. In this instance also the slotted portion of the spring member B is shown inclosing the resistant member C.

In the operation of the fastening device, with reference more particularly to Fig. 1, the thumb or finger piece $B^2$ is pressed downward, thereby forcing the spring member B toward the body member A, and after the conductor is inserted in the angular portions of the spring and resistant members the spring is released and its retractive force firmly grips the conductor.

According to this invention the single piece of resilient metal from which the fastening device is made has one end bent to form a retaining-angle B′ and a thumb-piece $B^2$, and said resilient piece of metal is then looped on itself, as at A′, in the opposite direction to the first bend to bring the retaining-angle close to the loop, thereby forming a strong spring, while the projecting hook or retaining portion C is adapted to coöperate with the said retaining-angle B′ to tightly clamp a conductor in defined position.

Figure 2:
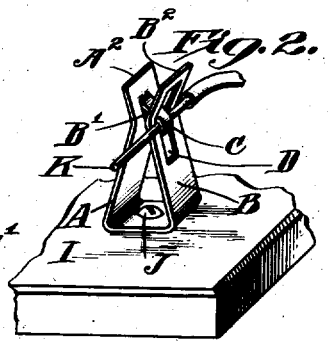

In Fig. 2 the fastening device is shown standing on end and secured to a base by means of the screw J, illustrating a different mode of supporting the device. In this instance the members A and B are shown projecting upwardly, and the ends $A^2$ and $B^2$ form finger-pieces, which may be grasped to force the opposing members into operative relationship, and thereby enable a conductor K to be inserted between the angular portions B′ and C of the device. When the finger-pieces $A^2$ and $B^2$ are released, the conductor is firmly gripped in the retaining portion C.

Figure 3:
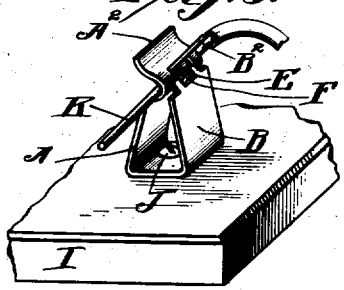

In Fig. 3 a modification of Fig. 2 is shown, in which the members A and B are cut away to form alternate projections and recesses, the projections of one member being adapted to enter the recesses of the other member. As shown, these members A and B are provided with a series of projections E, which enter slots F in the opposite member, the projecting members and slots being alternately arranged. Thus the gripping action on the conductor is augmented.

Figure 4:
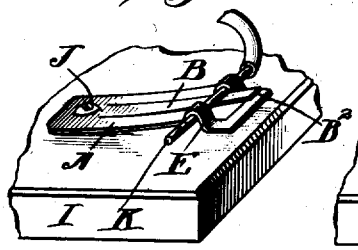

Fig. 4 shows a clip formed of two members horizontally arranged and made by cutting and shaping a single piece of metal, the lower member being provided with upwardly-extending hook-shaped portions E, between which the upper member B, in the form of a tongue, is located. In this instance, A is the body member, B is the spring member, and the portions E constitute the hook-shaped retaining portion.

Figure 5:
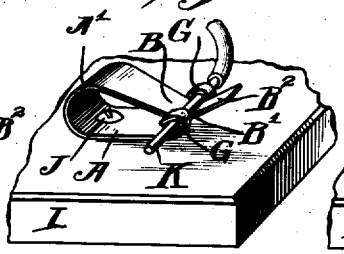

In Fig. 5 a reversal of the construction in Fig. 1 is shown, in which the hook-shaped retaining portion is divided, like Fig. 4, forming two retaining portions G, which inclose the spring member B instead of being inclosed thereby. In both Figs. 4 and 5 the retaining portions E and G form the stationary resistant member of V-shaped form.

Figs. 4 and 5 are provided with thumb-pieces $B^2$, and Fig. 5 also has the angular retaining portion B′ on the spring member B, which is situated close to the loop A′ to form a strong spring.

Figure 6:
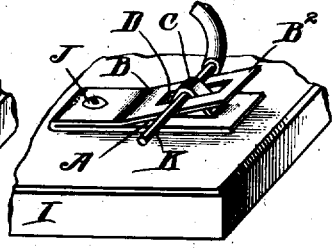

In Fig. 6 the spring member B incloses the resistant member C and the screw J passes through the flattened portion of the device.

Figure 7:
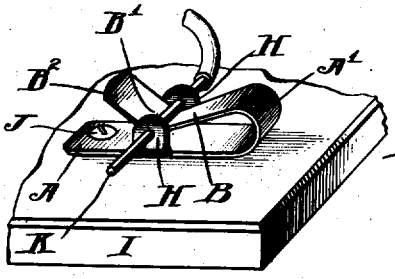
Figure 8:
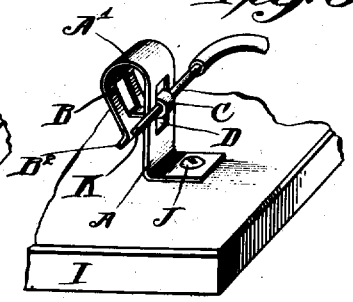

In Fig. 7 the body member A is provided with ears H, having apertures through which the conductor is thrust, these ears thereby forming the resistant member. The spring member B is situated between the ears and firmly clamps the wire in position.

In Fig. 8 a modification of Fig. 1 is shown, in which the member B instead of the member A is provided with a hooked retaining portion C, while the member A is provided with the slot or recess D, into which the retaining-hook C projects. In this instance the fastening device is arranged upright upon the support I instead of horizontally.

The various figures illustrate a fastening device or spring terminal-clip having its opposed members so disposed as to be normally separated, but which must be pressed together to receive the terminal of an electrical conductor between them, so that each member in a sense acts as a resistant member, tending to overcome the action of the other member. The spring or resistant action of the two members is opposed when a terminal conductor is situated between them and in position to be secured therein. The two opposed members A and B may have a horizontal relation, as shown in some of the figures, or a vertical relation, as shown in other figures, and they may be constructed of any suitable material—as, for instance, sheet metal.

The various constructions shown are those which I consider the best. I, however, do not limit myself to such constructions or any other similar constructions, provided that the opposing members are normally separated and act to exert a pressure upon each side of a terminal conductor when introduced between them. It will be observed that the clip is adapted to receive various sizes of terminal conductors and that the conductor is held not only by the resiliency of both members acting in opposition or the resiliency of one member acting in opposition to the resistant member, but also by the friction between the terminal conductor and the members with which it is in contact.

According to this invention the resilient metal is looped on itself to form a spring and has one end bent in a reverse direction to the loop to form with the bend of the loop an angular retaining portion, while a free-ended resistant portion projects from the opposite end of the loop toward the angular retaining portion. The apex of the hook-shaped wire-retaining portion projects toward the opposite member, and the wire is adapted to be held in the apex of the hook. The outer end of the resistant member is free, thereby forming an open hook.

Having thus described my invention, what I claim is:—

1. A fastening device for electrical conductors, comprising a flat body member of metallic ribbon having substantially greater width than thickness and adapted to lie upon a base and be fastened thereto, an opposing spring member of flat metallic ribbon situated opposite and normally separated from said body member, and a resistant member adapted to lie between said members and bent intermediate its length to form an angular wire-engaging portion, the apex of which projects toward one member and is adapted to coact with said member to clamp a conductor in defined position therein.

2. A fastening device for electrical conductors formed from a single piece of flat resilient metallic ribbon having substantially greater width than thickness and comprising a flat body member, adapted to lie upon a base and be fastened thereto, an opposing spring member situated opposite and normally separated from said body member, one of said members being provided with a resistant member bent intermediate its length to form an angular wire-engaging portion, the apex of which projects toward the opposite member to clamp a conductor in defined position therein, when said members are forced into operative relationship.

3. A fastening device for electrical conductors, comprising a piece of resilient metal looped on itself to form a spring and having one end bent in a reverse direction to the loop to form with the bend of the loop an angular wire-engaging portion, and a stationary free-ended resistant portion located at the opposite end of the loop and projecting toward the angular engaging portion, whereby when the spring is forced toward the resistant portion a conductor may be inserted between the resistant and engaging portions and be firmly gripped in defined position by the retractive force of the spring.

4. A fastening device for electrical conductors, comprising a body member and a spring member, one of said members being slotted centrally to form a projecting hook-tongue adapted to coact with the opposite member to clamp a conductor.

5. A fastening device for electrical conductors, comprising a body member and a spring member, one of said members being slotted centrally to form a projecting resistant member adapted to coact with the opposite member to clamp a conductor.

6. A fastening device for electrical conductors, comprising a body member and a spring member, one of said members being provided with a hook-tongue cut out of the body of the metal and adapted to coact with the opposite member to clamp a conductor.

7. A fastening device for electrical conductors, comprising a body member and a spring member, one of said members being provided with a resistant member cut out of the body of the metal, and adapted to coact with the opposite member to clamp a conductor.

8. A fastening device for electrical conductors, comprising a body member of flat metallic ribbon having substantially greater width than thickness and adapted to be secured to a support, a stationary resistant member bent intermediate its length to form an angular wire-engaging portion, the apex of which projects upwardly from the body member, and is adapted to engage a conductor, and an opposing spring member situated over and adapted to inclose the apex of the resistant member.

9. A fastening device for electrical conductors formed from a single piece of flat resilient metallic ribbon having substantially greater width than thickness and comprising two opposing normally separated members, one of said members being provided with a V-shaped wire-engaging portion projecting toward the opposite member and adapted to coact with said opposite member to firmly clamp a conductor when said members are forced into operative relationship.

10. A fastening device for electrical conductors formed from a single piece of resilient metal and comprising two opposing normally separated members provided with acute-angled wire-engaging portions projecting toward each other, with the angles in proximity so that when the members are forced together a conductor may be inserted in the angles of the angular portions and firmly gripped in defined position therein by the retractive force of at least one member.

11. A fastening device for electrical conductors comprising a single piece of resilient metal having normally separated opposing members, one being provided with an inwardly-projecting acute-angled wire-engaging portion and the other with a hook-shaped wire-engaging portion projecting toward the first member and adapted to coact therewith, whereby when the members are forced together a conductor may be inserted in said hook-shaped engaging portion, and firmly gripped in defined position therein by the retractive force of at least one of the members.

12. A fastening device for electrical conductors formed of a single piece of resilient metal, comprising a body member, a stationary hook-shaped resistant member projecting upward from the body member and having its outer end free, thereby forming an open hook, and an opposing spring member projecting upwardly from the body member at the forward end of the body member, then downwardly toward the resistant member and in proximity thereto, then upwardly away from the body member.

In testimony whereof I affix my signature in the presence of two witnesses.

JOHN SCHADE, JR.

Witnesses:

ERNEST B. FAHNESTOCK,
JOHN SCHADE.